Aug. 2, 1966 V. J. SIMPSON 3,263,781
TORQUE CONVERTER WITH LOCKING MEANS
Filed Oct. 18, 1965 5 Sheets-Sheet 2

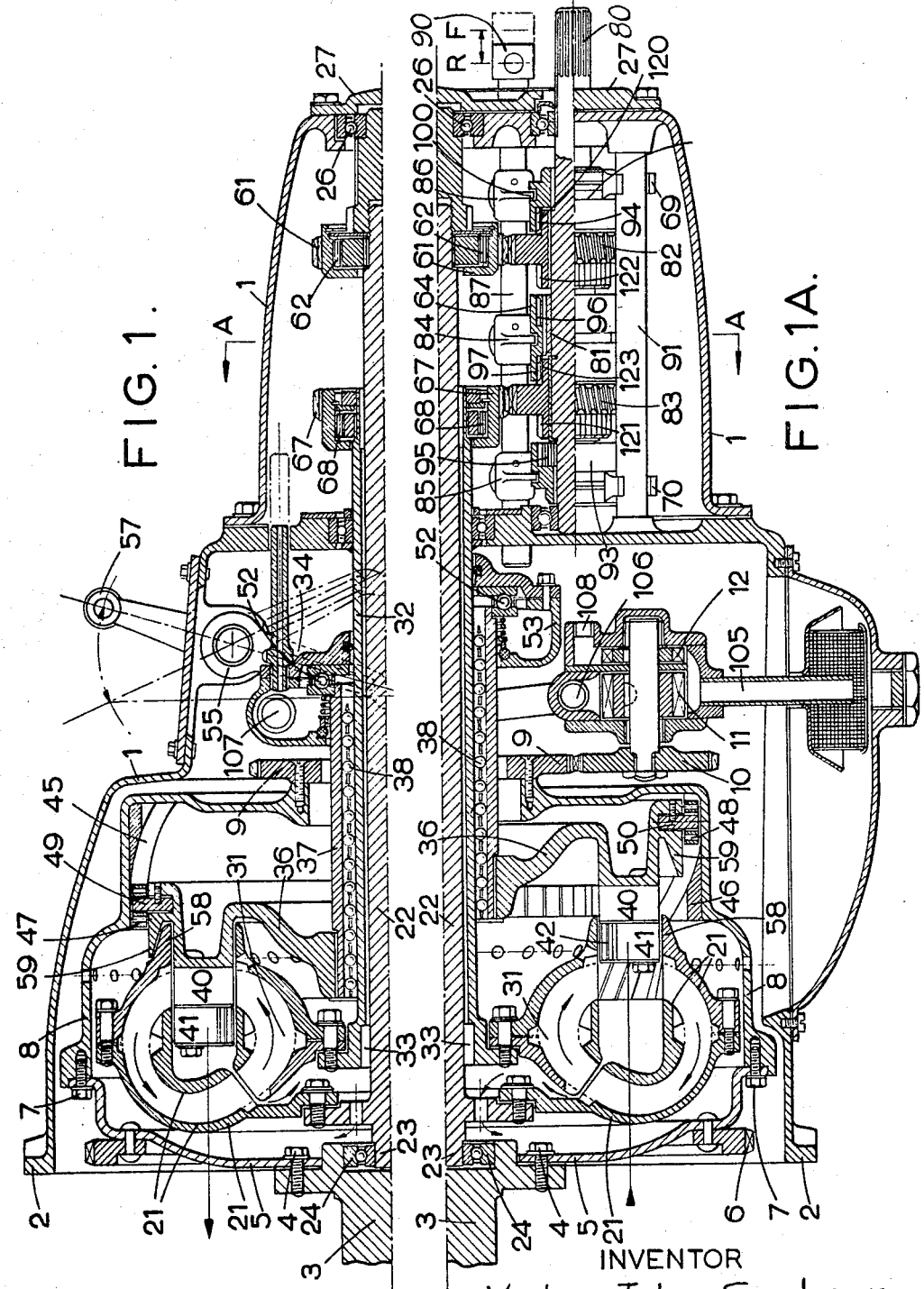

INVENTOR
Victor John Simpson
BY Shoemaker and Mattare
ATTORNEY

Aug. 2, 1966  V. J. SIMPSON  3,263,781
TORQUE CONVERTER WITH LOCKING MEANS
Filed Oct. 18, 1965  5 Sheets-Sheet 3
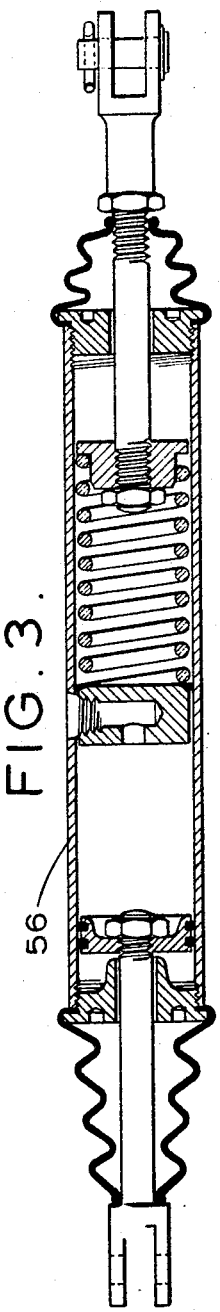
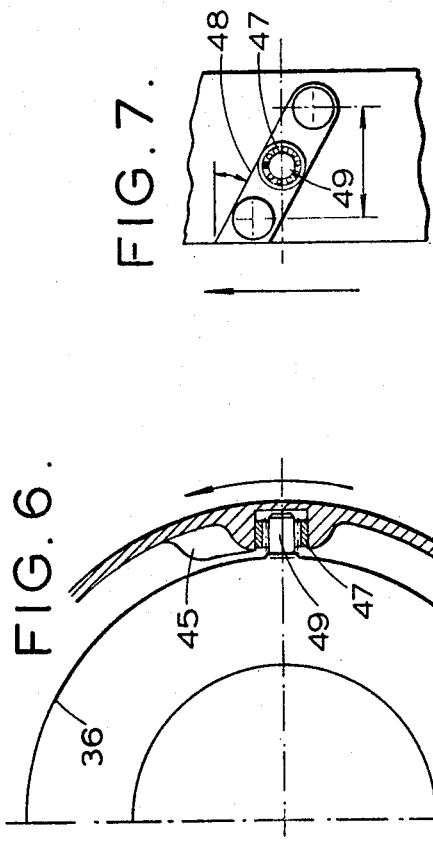
INVENTOR
Victor John Simpson
BY Shoemaker and Mattare
ATTORNEY

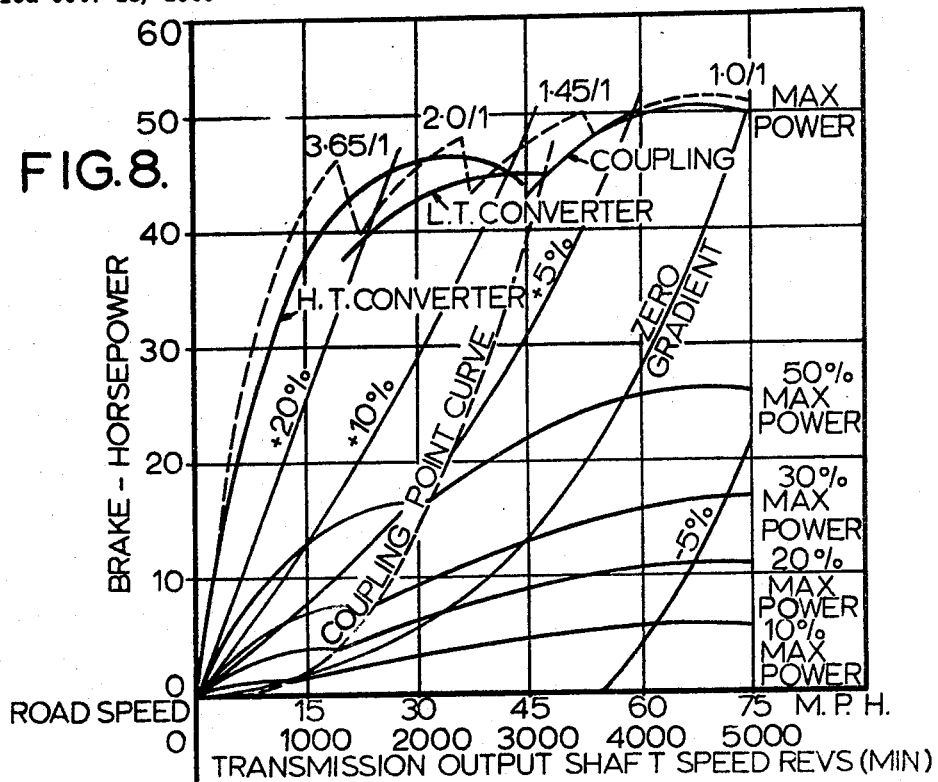
FIG. 8.
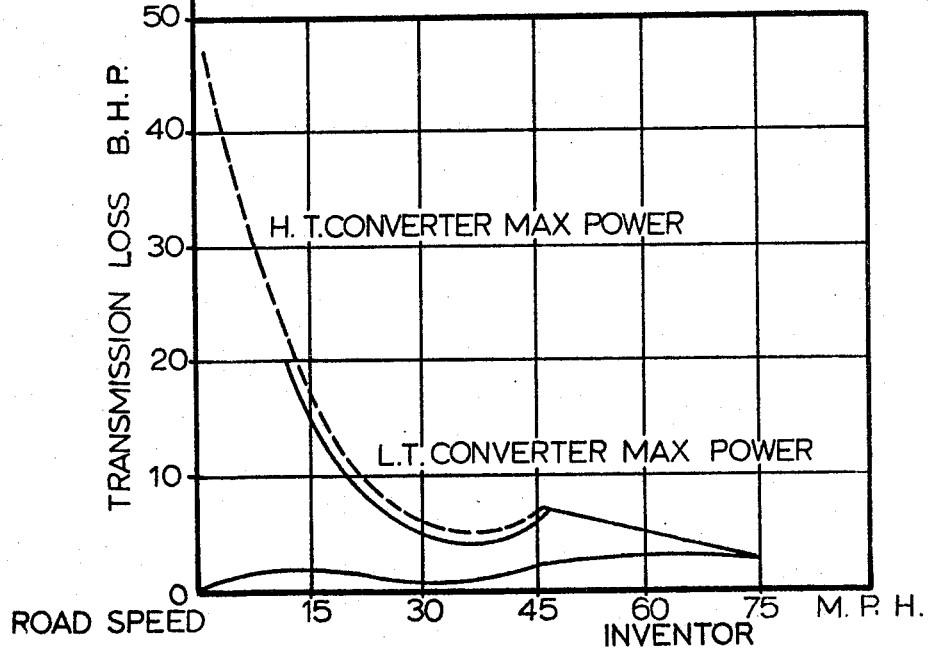

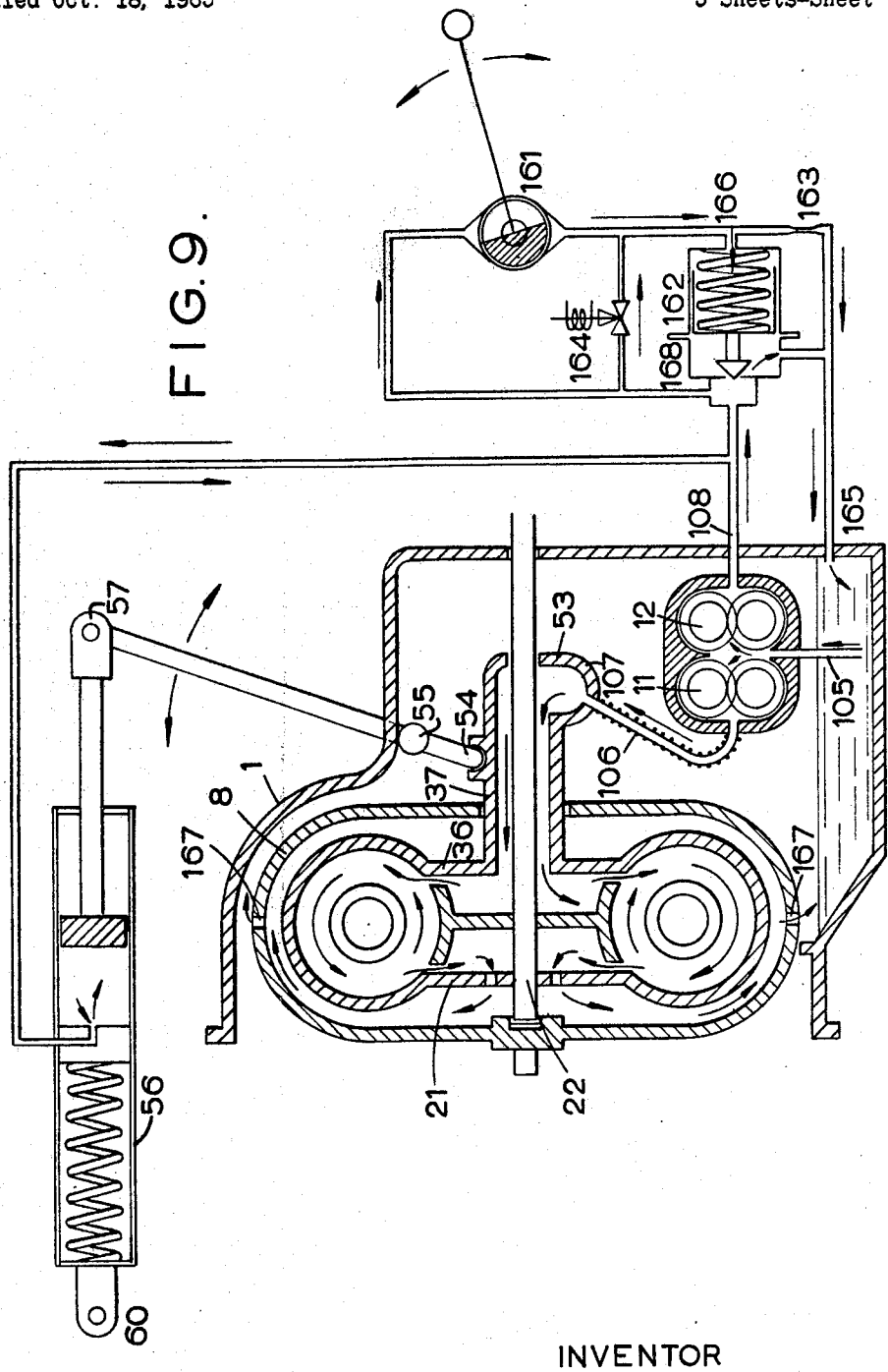

United States Patent Office 3,263,781
Patented August 2, 1966

3,263,781
TORQUE CONVERTER WITH LOCKING MEANS
Victor John Simpson, Tallyho, Onslow Road, Burwood Park, Walton-on-Thames, England
Filed Oct. 18, 1965, Ser. No. 497,432
9 Claims. (Cl. 192—3.2)

This invention relates to torque converters with more especial reference to vehicle transmission mechanisms including torque converters which obviate the need for a clutch and gearbox as normally present in a conventional automobile transmission. This application is a continuation-in-part of application Serial No. 247,117 filed December 26, 1962 for torque converters.

In the case of an automobile transmission, the invention provides a method of translating engine power into tractive effort over the entire range of engine speeds at infinitely variable speed ratios and torque ratios using a hydrokinetic torque converter with multiple impellers operating to satisfy conditions of high torque or high coupling efficiency as demanded. Speed ratio between input and output shafts is automatically controlled from the torque reaction on the engine at all engine speeds.

The improved transmission mechanism according to the invention includes a hydrokinetic torque converter having a turbine blade ring attached to the output shaft of the transmission, an impeller attached to a sleeve rotating co-axially about the output shaft and a reactor blade ring having means by which it may be locked to the static frame of the mechanism under predetermined conditions, the impeller consisting of at least two blade rings of differing characteristic forms either of which may be directed into the working fluid flow path of the converter.

The impeller conveniently comprises two blade rings of differing inlet and exit blade angles arranged on an axially floating bearing so that either impeller blade ring may be located in the working fluid flow path, or they both may be retracted from such path.

A principal feature of a preferred embodiment of the invention is the method of drive to the impeller from the vehicle engine in the case of an automobile transmission. The drive is carried through helical tracks into which trunnion bearings mounted on the impeller shaft sleeve extension engage. Torque required to turn the impeller via the trunnion bearings and the helical tracks is at all times equal to engine torque. The two forces are at all times equal and opposite. Depending on the selected helix angle relative to the axis a given engine/impeller torque will produce a proportional resultant thrust force in a direction which tends to retract the impellers from the fluid circuit.

The impellers are mounted on a sleeve the whole assembly of which is carried on an axially floating bearing. The end of the sleeve opposite to the impeller carries a thrust race against which bifurcated arms react with a thrust produced by a servo-ram system. The servo-ram is a combination of hydraulic or pneumatic and spring loading. The servo-ram has one end fixed to the frame. The function of the servo-ram is to provide a thrust force equal and opposite to the resultant force generated by the action of the trunnion bearings in the helical track. This corresponding force can be set to a desired level by variation of the fluid pressure within the ram which represents the maximum torque to be imposed on the engine. This torque value must of course be slightly higher than the tractive effort torque required at maximum road speed.

The characteristic brake horsepower/r.p.m. curve of an internal combustion engine indicates that engine torque is lowest at the point of maximum road speed.

This characteristic allows a torque balance value to be selected whereby the engine torque capabilities at low output shaft revolutions per minute are such that wide opening of the throttle will result in a thrust being produced by the helix system which will retract the servoram, thus withdrawing the low torque impeller from the fluid circuit and automatically substituting the high torque impeller. As the speed ratio between engine and output shaft decreases, a point will be reached when the engine torque capabilities are equal and ultimately less than the torque balance point. At this point the servoram overcomes the thrust produced by the helix. In this condition the low torque impeller assumes position in the fluid circuit once again. A cone clutch between the impeller and the turbine is engaged by axial movement of the impeller system. The cone clutch becomes operative when the servoram overcomes the resultant thrust from the helical drive and the impeller system is moved axially in such a manner that the cone clutch provides a limit stop to further axial movement on engagement.

The operation of the transmission falls into five distinct categories:

(1) De-coupled—in which the impeller blade rings are completely withdrawn from the fluid circuit. No energy is transmitted and the engine idles free from load. This condition is achieved by evacuating the servo-ram which retracts the impellers.

(2) High torque converter—where the high torque impeller is in the fluid circuit and is held in location by the demand for output torque calling for an input torque equivalent to the torque balance point at which the thrust of the trunnion/helix system equals the thrust of the servo-ram system. In this condition the reactor blade ring is locked to the frame.

(3) Low torque converter—where the low torque impeller is in the working fluid circuit and where the reactor blade ring is locked to the frame. This condition exists when the output torque demanded is greater than the engine torque at unity speed ratio and where the speed ratio is such that this condition may be satisfied with an input torque lower than the torque balance value.

(4) Coupling—the operation of which is determined by the design coupling point of the converter and at which point the angular whirl velocities of the fluid in the fluid circuit cease to be reactive on the reactor blade ring. The reactor blade ring will then assume the characteristics of a turbine under "racing" conditions and would rotate with the coupling.

(5) Drive—when the cone clutch is engaged by thrust from the servo-ram overcoming the reaction torque thrust produced by the helix thus locking the impeller to the turbine so that both rotate at the same speed.

The invention will be further described with reference to the accompanying drawings wherein:

FIGURES 1 and 1a are upper and lower longitudinal vertical sections of one embodiment of automobile transmission mechanism. FIGURE 1 shows cone clutch engaged; FIGURE 1a shows impellers withdrawn from fluid circuit.

FIGURE 3 is a longitudinal vertical section of an appropriate form of servo-ram for operating the transmission.

FIGURES 6 and 7 are also detailed views of one of the trunnion bearings on the impeller engaging a helical track on the engine driven rotor.

FIGURE 8 is a power output diagram, and
FIGURE 9 is a diagram of the fluid circuit.

Figure 5:
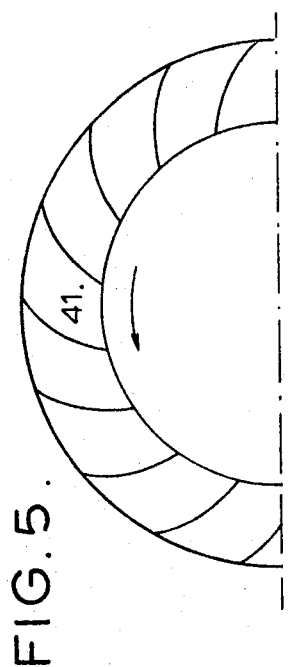
FIGURES 4 and 5 are detailed views of portions of impellers showing blades suitable for low torque transmission and high torque transmission respectively.

Referring now to the drawings, but first more particularly to FIGURES 1 and 3, in the embodiment illustrated, 1 designates a transmission casing or static frame having a flange for attachment to the rear of an engine crankcase (not shown). 3 is the engine crankshaft to which is bolted at 4 a dished disc 5 having a toothed starter ring 6 and forming a front cover for the rotating parts of the transmission.

Bolted to the rear of the disc 5 at 7 is a rotor 8 having a spur wheel 9 driving a pinion 10 of a gear pump 11 for circulating working fluid, usually oil. The working fluid enters the pump through the inlet 105 and is discharged through a flexible tube 106 to thrust collar housing inlet 107. A second combined gear pump 12 is driven by the pinion 10 and supplies oil through outlet 108 to a conventional remote manually adjustable pressure reducing valve hereafter more fully described with reference to FIGURE 9.

21 is a turbine comprising a toroidal shell with an internal ring of blades mounted within the rotor 8 immediately in rear of the disc 7 on a turbine shaft 22 co-axial with the crankshaft 3 and having a reduced portion or spigot 23 mounted in ball race 24 in the rear end of the crankshaft.

The other end of the turbine shaft 22 is carried in a ball race 26 mounted in a removable rear extension 27 of the transmission case 1.

Complementary to the turbine 21 is a reactor 31 rotating about the same axis, and mounted on a reactor quill shaft 32 co-axial with the turbine shaft 22 and carried by a front bearing 33 thereon and a ball race 34 in the rear wall of the transmission casing 1.

Also complementary to the turbine 21 and reactor 31 is a two-stage impeller 36 mounted at the front end of an axially slidable sleeve 37 co-axial with the turbine and reactor shafts and riding on ball bearings 38 encircling the reactor shaft 32.

The impeller 36 has a set of high torque blades 41 and a set of low torque blades 40 either of which may be brought into the path of the working fluid in the toroidal chamber formed by the complementary turbine component 21 and reactor component 31 of the fluid coupling.

In FIGURE 1 the sleeve 37 is shown in its advanced position to the left of the figure with the low-torque impeller blades 40 in the path of the working fluid and the cone clutch engaged. While in the lower half shown by FIGURE 1a the sleeve 37 is retracted to the right of the figure showing both high torque blades 41 and low torque blades 40 withdrawn into an annular space 42 formed for the purpose between the turbine 21 and the reactor 31.

Carried by the rotor 8 in a preferred embodiment are at least two pairs of helical tracks 45 and 46, shown diametrically opposite each other in FIGURES 1 and 1a, and engaged by roller races 47 and 48 carried by trunnions 49 and 50 projecting radially from the impeller 36.

At its rear end, the sleeve 37 is provided with a thrust race 52 and a thrust collar 53 engaged by a thrust arm 54 pivoted to the transmission casing 1 at 55 and actuated through the link arm 57 by servo-ram mechanism generally designated 56 illustrated in FIGURE 3. The other end of the servo-ram 56 is anchored to the static frame at 60.

58 is a cone lock on the turbine 21 projecting rearwardly therefrom and having a conical peripheral wall co-operating with an inverted hollow conical peripheral surface 59 of a complementary cone lock on the impeller 36 when the latter is in its advanced position shown in the upper half, FIGURE 1.

In the embodiment illustrated, forward drive is taken from a spur gear 61 on the rear of the turbine shaft 22. 62 is a unidirectional roller clutch, the inner portion of which is splined to turbine shaft 22 and which provides positive drive when the turbine is rotating clockwise viewed from the crankshaft end and allows free rotation when the turbine is rotated anti-clockwise. 67 is the reverse drive spur gear, and 68 is a unidirectional clutch providing positive drive when the reactor blade ring is rotated anti-clockwise when viewed from the crankshaft end and permitting free rotation when the reactor blade ring is rotated in a clockwise direction.

Figure 2:
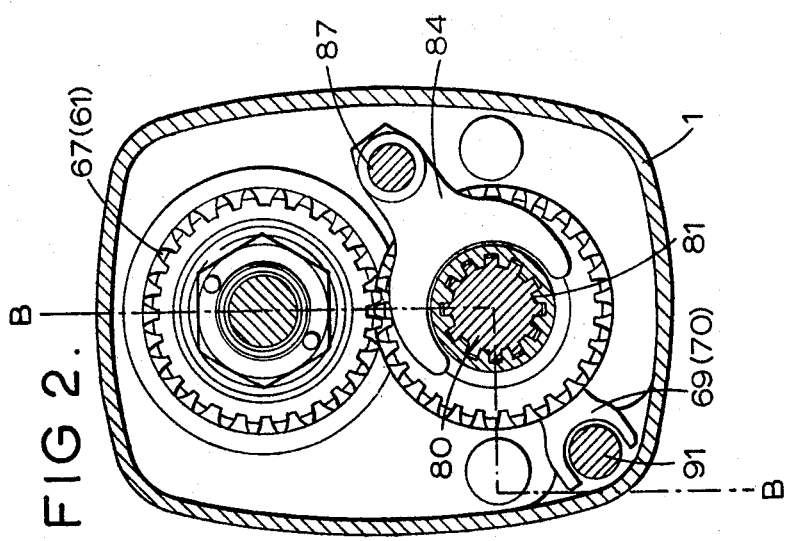
FIGURE 2 is a transverse section on the line A—A of FIGURE 1.

80 is the power output shaft and 81 is a splined section on which the axially movable internally splined sleeve 64 co-operates. 82 is the forward drive gear constantly enmeshed with gear 61 and free to rotate about output shaft 80. 83 is the reverse drive gear constantly enmeshed with reverse drive gear 67 and also free to rotate about output shaft 80. 84 is an operating fork arm, shown in both FIGURES 1a and 2, to be in engagement with the collar of splined sleeve 64 and is attached to rod 87. 85 and 86 are similar forked actuators attached to the rod 87 all of which move axially in unison by manual axial movement of the rod termination 90. 91 is a static rod anchored to the casing or frame 1 at both ends. 69 and 70 are forked torque arms free to slide axially along the static rod 91. 92 and 93 are collars in engagement with forked arms 85 and 86. Torque arm 70 is attached to collar 93 thus preventing the collar 93 from rotating. Torque arm 69 is attached to collar 92 which also prevents collar 92 from rotating. The driven shaft 80 is free to rotate within the collars 92 and 93. The splined collar 64 rotates with the output shaft 80. The collar and torque arm component 93 and 70 is provided with an internal dog spline 95 which is arranged to engage a similar dog spline 121 on reverse drive spur gear 83. Similarly 92 and 82 have engaging dog splines at 94 and 120. Splined collar 64 is also provided with dog splines 96 and 97 at each end which enmesh with similar dog splines 122 on the forward drive gear and 123 on the reverse drive gear.

Manual axial movement of the operating rod 90 to the extreme left as shown in FIGURE 1a results in the reverse drive becoming positive from quill shaft 32 through unidirectional clutch 68 to gear 67 enmeshed with gear 83 which is also engaged with dog spline 97 through splined collar 64 to output shaft 80. At the same time fork arm 86 engaged with collar 92 at 100, positions collar 92 to engage dog spline 94 on spur gear 82. The turbine is now locked to the casing 1 against clockwise rotation through the shaft 22 and the unidirectional clutch 62 to spur gear 61 enmeshed with gear 82 engaged with dog splines 94, 120 and locked against rotation by collar 92 and torque arm 69 co-operating with rod 91 to casing 1. In reverse drive the functions of the turbine blade ring 21 and the reactor blade ring 31 are transposed.

Movement of the selector rod 87 by termination 90 to the extreme right of the figure would result in forward drive. Turbine 21 through shaft 22 and unidirectional roller clutch 62 provides positive clockwise drive to spur gear 61 enmeshed with gear 82 engaged with dog splines 96, 122, to 64 and spline 81 to output shaft 80. At the same time reactor 31 through quill shaft 32 and unidirectional clutch 68 provides positive drive in anti-clockwise rotation to spur gear 67 enmeshed with gear 83 engaged with dog splines at 95, 121 to provide unidirectional lock of reactor to casing via 70 and 91.

During torque conversion the torque on the reactor blade ring is anti-clockwise and therefore constrained. As the speed ratio between input and output shafts diminishes a point is reached where the torque on the reactor blade ring becomes clockwise and the unidirectional clutch allows the reactor member to rotate freely clockwise offering the lower flow resistance to the fluid.

The fluid circuit is shown diagrammatically in FIGURE 9 and may be subdivided into two sections, the working fluid circuit and the control fluid circuit. For simplicity the detailed components are omitted from the diagram.

The working fluid circuit is supplied from gear pump 11 and the control fluid circuit is supplied through gear pump 12.

Fluid for the working fluid circuit is drawn as aforementioned through suction tube 105 from the sump into the pump 11 and is discharged through a flexible pressure hose 106 to the thrust bearing housing 53 for the axially movable impeller at 107. Fluid passes along the sleeve 37 and is allowed to enter the torque converter toroidal path through perforations in the reactor blade ring. The toroidal circuit is thus maintained full of fluid and pressurised. Overspill fluid leaves the toroidal circuit through perforations in the turbine blade ring at 166. Centrifugal action in the rotating casing drains the casing of fluid through ports 167 whereby the fluid is returned to the sump.

The basic control fluid circuit has the following features: fluid for the control circuit is drawn through suction tube 105 into gear pump 12. Fluid is discharged from 108 to supply servo ram 56 which is anchored to the static frame at 60 and operates the thrust arm 57. The pressure in this fluid circuit and hence the force exerted by the servo ram 56 is controlled by pressure control valve 162. 161 is a variable orifice manual control valve in series with flow restrictor 163. Pressure existing at 166 supplements the light spring pressure in the servo operated pressure reducing valve 162.

Fluid pressure at 168 is thus controlled by the throughput of the manually variable orifice 161. 164 is an electrically operated solenoid valve responsive to a predetermined minimum road speed which, when energised bypasses the manual control valve 161 and allows full pump pressure at 166 and within the servo ram 56 to operate cone lock 58, 59. Fluid is returned to the sump at 165.

In a vehicle transmission of conventional gear box type, we can summarise by saying: When the torque demanded at the output shaft is greater than the engine torque capabilities at zero speed ratio a condition of engine stall exists. It can be overcome by engaging a suitable gear ratio to provide the output torque demanded. The object of providing a gearbox with a number of fixed ratio drives is to achieve satisfactory power over a range of road speeds which can be illustrated graphically by a power envelope curve. The power envelope indicates the total power available in tractive effort over the entire range of roadspeeds and transmission speed ratios.

The performance of a vehicle in terms of acceleration is directly related to the graphically illustrated power envelope. The power envelope as shown in FIGURE 8 also shows a conventional four speed manual gearbox power envelope superimposed on the graph. In order to achieve the power envelope shown for the four speed gearbox, a driver must change gear at the precise points shown on the graph. Any deviation or lack of judgment would show a performance inferior to the Torque Balance System according to the invention which automatically selects the precise speed ratio to provide the power envelope shown on the graph.

In practice, conditions of road gradient and acceleration are provided for by the automatic selection of the precise speed ratio and torque ratio which corresponds to the optimum performance of the engine necessary to meet the conditions existing.

The torque balance transmission allows for a vehicle to idle away from a standing start without going into converter operation and utilmately reach maximum road speed through a smooth and progressive increase. Alternatively, wide opening of the throttle will cause the Hydrocyclic unit to go in to high torque converter and the vehicle will then rapidly accelerate taking full advantage of the initial five to one torque ratio and utilising to the full output power curve plotted by the power envelope FIGURE 8. Any performance between these positions is automatically fulfilled at optimum engine performance.

Conditions of partial throttle opening together with the respective coupling point speeds are also shown on FIGURE 8 together with the positive and negative gradient power requirement curves. It will be seen that on a five percent negative gradient only ten percent of the engine power is required to maintain a road speed of sixty miles per hour. This is achieved in coupling conditions. For a steep hill of twenty percent positive gradient for the case indicated, FIGURE 8 shows that at twenty-eight miles per hour the high torque converter would be in operation giving a tractive effort of forty-five brake horsepower at an efficiency of 85.5%.

Figure 4:
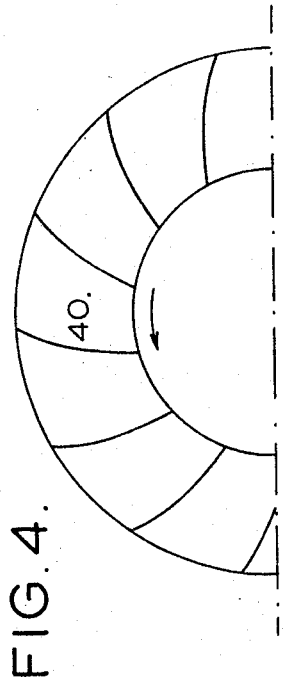

The hydrodynamic design of the converter/coupling with two stage impeller as shown say in FIGURES 4 and 5 is such that its characteristics with the high torque impeller in the fluid circuit give a torque ratio of the order of five to one at stall whilst the low torque impeller will have a coupling point of 0.86 and a coupling efficiency of the order of 95% in the case illustrated in FIGURE 8.

Moreover, in the decoupled position with both sets of impeller blades withdrawn from the fluid circuit the engine is permitted to idle free from load with consequent economy in fuel consumption.

I claim:

1. Transmission mechanism including a hydrokinetic torque converter having a turbine blade ring carried by and secured to a power output shaft, an impeller, a sleeve rotating about the output shaft and carrying the said impeller, a reactor blade ring, a power input rotor, means by which said reactor blade ring may be locked to the static frame of the mechanism under predetermined conditions, helical drive means connecting said power input rotor to said impeller, said impeller comprising at least two blade rings of differing characteristic forms either of which blade rings may be directed into the working fluid flow path of the converter upon relative axial movement of the impeller and turbine blade ring through the medium of said helical drive.

2. Transmission mechanism according to the preceding claim 1, including means for selectively locating either impeller blade ring in the working fluid flow path or retracting both blade rings from such path.

3. Transmission mechanism according to claim 1, wherein the input torque through the helical drive from the rotor produces an axial thrust on the impeller in a direction tending to retract it from the fluid circuit.

4. Transmission mechanism according to claim 1, including a servo-ram associated with said input impeller to provide an axial thrust on said impeller opposed to the axial thrust generated by the input torque.

5. Transmission mechanism according to claim 1, including a cone lock between the input and the impeller operative on further axial movement of the impeller after the fluid coupled condition of the torque converter has been reached.

6. A fluid torque converter transmission comprising a casing having a forward end and a rearward end, a rotor housing in the casing, means for coupling said housing to a crankshaft at the forward end of the casing, a turbine blade ring, a power output shaft extending axially of and through the rotor housing and having a bearing connection at its forward end with the rotor housing coaxial with the crankshaft coupling, a casing supported bearing for the rear end of said output shaft, said turbine blade ring being secured to the forward end of the power output shaft, a quill shaft encasing said output shaft and having bearing support at its forward end on the output shaft, bearing support means on said casing for the rear end of said quill shaft, a reactor blade ring secured on the forward end of the quill shaft to rotate thereon in cooperative relationship with said turbine blade ring, an impeller having at least two rings of different characteristics, sleeve means extending longitudinally of and supported for reciprocal movement on the quill shaft and carrying said impeller on its forward end, a driving connection between the rotor housing and the impeller, means whereby input torque effects axial movement of the impeller in a direction tending to withdraw the blade rings thereof out of the fluid circuit, and a power take-off drive means carried by said casing.

7. The invention according to claim 6, wherein the said means for effecting axial movement of the impeller comprises a helical track carried by said rotor and said driving connection comprises a trunnion carried by and extending radially of the impeller and having an outer end operatively engaging said track.

8. The invention according to claim 6, with cone clutch lock elements carried one by the impeller and the other by the turbine blade ring and adapted for interlocking engagement when the impeller is in an advanced position relative to the turbine blade ring.

9. The invention according to claim 6, wherein the two impeller rings are in coaxial relationship parallel with the axis of movement of the impeller.

References Cited by the Examiner

UNITED STATES PATENTS

| | | | |
|---|---|---|---|
| 2,393,859 | 1/1946 | Jandasek | 60—54 |
| 2,407,497 | 9/1946 | Jandasek | 60—54 |
| 2,623,407 | 12/1952 | Mayer | 60—54 |
| 2,699,236 | 1/1955 | Black | 192—3.2 |

DAVID J. WILLIAMOWSKY, *Primary Examiner.*